Patented July 15, 1924.

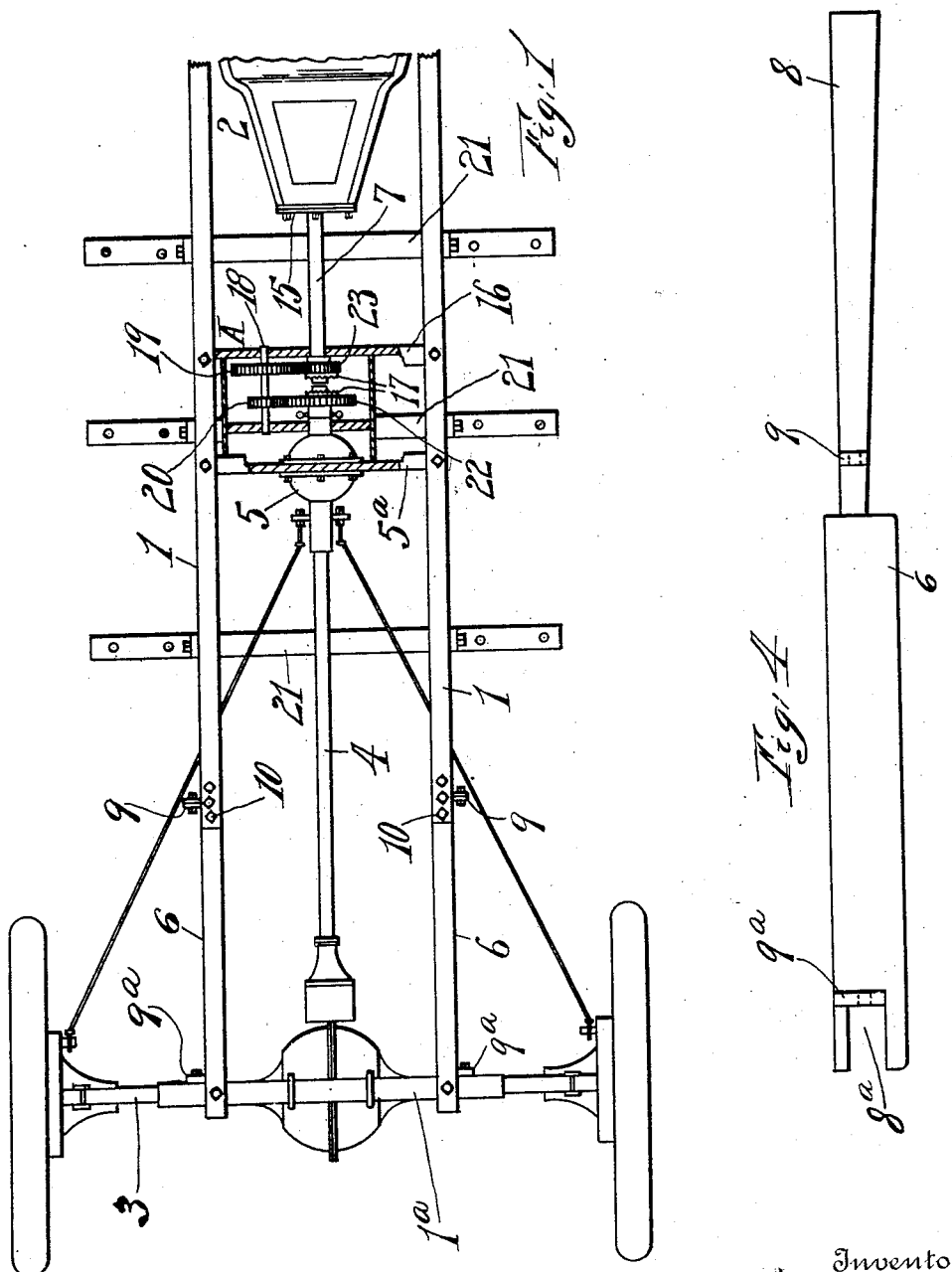

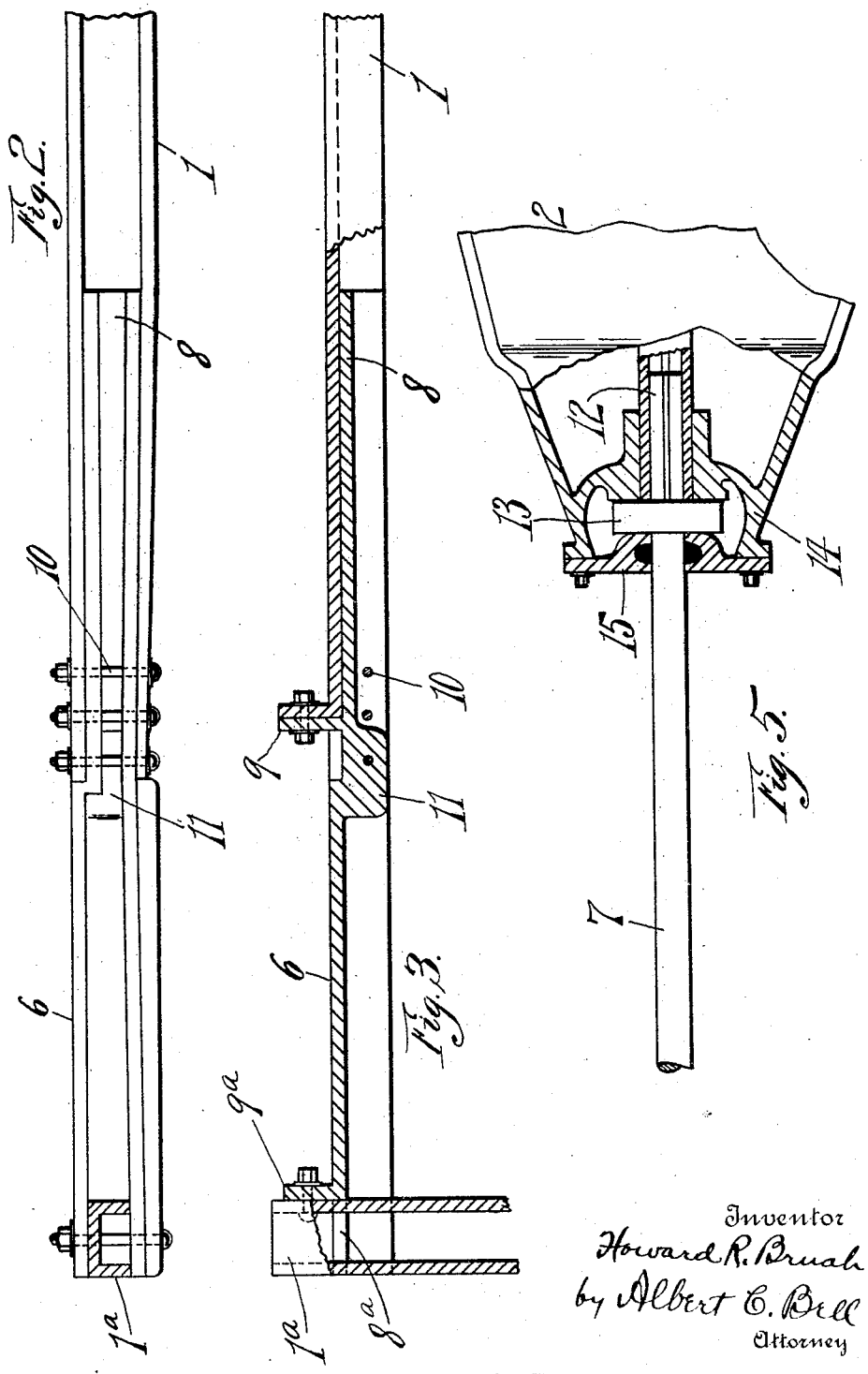

1,501,701

UNITED STATES PATENT OFFICE.

HOWARD R. BRUAH, OF CHICAGO, ILLINOIS.

EXTENSIBLE AUTOMOBILE CONSTRUCTION.

Application filed July 25, 1917. Serial No. 182,776.

*To all whom it may concern:*

Be it known that I, HOWARD R. BRUAH, a citizen of the United States, residing at the city of Chicago, in the county of Cook and State of Illinois, have invented certain new and useful Improvements in Extensible Automobile Construction, of which the following is a specification.

My invention relates to means for lengthening the chassis and driving shaft of a motor-car whereby a pleasure car may readily be converted into a truck of a type calculated for hauling merchandise which may be bulky but not necessarily heavy and has for its chief object the providing of certain new and novel arrangements, connections and combinations of parts for effecting such conversion. Another object is to provide means for maintaining a desired form of speed as required for commercial purposes and to re-inforce the converted chassis at a point adjacent the speed controller. Other and further objects will appear in the following specification and a clearer understanding of the invention will be had from an inspection of the drawings forming part of the present application and illustrating certain embodiments of my invention.

In the drawings Fig. 1 represents a top or plan view of a reconstructed chassis; Fig. 2 is a fragmentary view in elevation of the reconstructed chassis frame; Fig. 3 a sectional plan view of Fig. 2; Fig. 4 is a detail view of one of the extension strips or pieces and Fig. 5 is a detail view of the stud-shaft connection with the power plant.

Referring to the drawings, the parts of the original chassis comprises side members 1 and an end member 1ᵃ of channel iron, a power plant 2, a rear axle 3, propeller 4 and flexible connection 5. The parts used for the extending or lengthening of the original chassis are a pair of extension frames 6 and a stud-shaft 7. To convert or re-construct a car or machine after the pleasure body has been removed necessitates the disconnecting of the end member 1ᵃ from the side member 1, and the dis-connecting of the propeller from the power plant. This dis-connected portion is moved away from or to the rear of the chassis. The extension frames are now fitted between the end member 1ᵃ and the members 1 and the stud-shaft 7 fitted between the flexible joint 5 and the transmission shaft of the power plant 2, a cross piece 5ᵃ being employed to support the joint 5.

The chassis extension pieces 6 are made of channel iron and each consists of a unitary structure shaped at one end as at 8 to fit within the tapered portion of the rear of a Ford side frame 1 and bifurcated as at 8ᵃ at the other end to fit over the rear piece 1ᵃ. Each extension piece 6 is also provided with attachment lugs 9 and 9ᵃ so that rigid connection as by bolts may be made with respect to said rear piece and said side pieces. To further secure the parts together bolts 10 are passed vertically through the rear of a side piece and through an extension piece. Each extension piece may be re-inforced by a suitable vertically disposed rib 11. In making the driving connection I employ a stud-shaft having a squared end 12 to fit within the transmission shaft of the power plant and also having an annular collar 13. The collar 13 is in abutting relation with the casing 14 and the collar is held rotatively thereagainst by means of a combined bearing and retaining plate 15 which is fixed to said casing. No slip or longitudinal movement can thus take place in the studshaft. The opposite end of the studshaft is shaped to accommodate the squared end of the flexible connection 5. In order to provide for the reducing of the gear ratio of the original pleasure car differential I employ apparatus designated A which is supported in a casing or housing carried by the side members 1, and cross pieces 5ᵃ and 16. For this purpose the stud shaft is divided into two sections properly held together in rotative relation. One section of the stud shaft is provided with a shiftable gear wheel 22 and the other section with a fixed gear wheel 23 the opposed faces of these gear wheels being provided with annular, notched sections 17 for cooperatively engaging one another as the shiftable gear is caused to engage with the fixed gear. It will be apparent that the two sections of the stud-shaft rotate in unison when the said gears are coupled together.

In order to provide for a selective speed a shaft 18 is provided having fixed thereon gear wheels 19 and 20 of which gear 19 is always in mesh with the gear wheel fixed to the stud shaft and of which gear wheel 20 is in mesh with the shiftable gear on the stud-shaft at such times as the shiftable gear is not coupled to the fixed gear upon the stud-shaft. Any desired means may be employed for effecting said coupling of gears. Cross bars 21 are provided centrally of the chassis and fixed beneath the propeller, speed regulator casing and stud-shaft in any appropriate manner for the purpose of strengthening the lengthened side members and for the prevention of said parts falling to the street or road in case of breakage.

It should be understood that my invention is not limited strictly to the exact details of construction shown in which my invention is illustrated as applied to a particular form of existing automobile construction, but my invention includes a reasonable range of equivalents of structures.

What I claim as new and desire to secure by Letters Patent is:—

1. In an automobile the combination of a chassis including motor-transmission and propeller-shafts, the side pieces of the frame of which chassis have been lengthened, with a fixed support, a stud-shaft operatively interposed between said motor-transmission and propeller shafts having a collar disposed in abutting relation with said fixed support and a fixed bearing plate for maintaining said collar in said abutting relation to prevent longitudinal movement of said extension shaft.

2. An automobile construction as described in claim 1, characterized by a two-part stud-shaft operatively interposed between and having flexible connection with said motor-transmission and propeller-shafts.

3. In a connection of the character stated, the combination of a transmission shaft, a support therefor, a stud-shaft provided with a fixed collar adapted for abutting relation with said support and a substantially flat disc-like retaining plate having a central stud-shaft receiving opening therethrough, said plate provided with a slight annular offset having an annular recess therein concentric with the plate opening and in communication therewith to receive a pliable washer, the flat face of said offset serving as a bearing surface for said collar and means for securing said plate to the support.

4. In a connection of the character stated, a transmission shaft, a support therefor, a propeller-shaft equipped with a universal joint, a stud-shaft operatively connecting the motor-transmission shaft and the universal joint of the propeller-shaft which stud-shaft is provided with a collar for abutting against the said support and a retaining plate operative to maintain said collar in abutting position with said support to prevent endwise movement of the stud-shaft.

5. In a connection of the character stated, a transmission shaft, a support therefor, a propeller-shaft, a stud-shaft operatively connected between the two shafts, an element fixed to the stud-shaft in abutting relation with the support and means operative to maintain said element in abutting relation with said support to prevent endwise movement of the stud-shaft.

6. In a connection of the character stated, an extension shaft fitted to a rotatable medium, a support therefor, an element fixed to the extension-shaft adapted for abutting relation with the support and a disc-like retaining plate fitted over said extension-shaft and clamped to said support, the bearing face of said plate having a slight annular offset provided with a washer receiving recess therein, which offset is in abutting relation with the element on said extension shaft.

7. In a connection of the character stated, a transmission shaft, a support therefor, a propeller-shaft, a stud-shaft operatively connected between the two shafts, which stud-shaft is provided with a collar in abutting relation with said support and a retaining medium operative to maintain said collar in its abutting relation with the support to prevent endwise movement of the stud-shaft.

In testimony whereof, I have hereunto signed my name.

HOWARD R. BRUAH.

Witnesses:
 ALBERT C. BELL,
 FLORENCE W. WOOD.